US012700357B2

(12) United States Patent
Jung et al.

(10) Patent No.: US 12,700,357 B2
(45) Date of Patent: Aug. 4, 2026

(54) DISPLAY DEVICE WITH COMBINED DRIVING METHODS

(71) Applicant: SAPIEN SEMICONDUCTORS INC., Gyeonggi-do (KR)

(72) Inventors: Jun Young Jung, Gyeonggi-do (KR); Myunghee Lee, Gyeonggi-do (KR)

(73) Assignee: SAPIEN SEMICONDUCTORS INC., Seongnam-si (KR)

( * ) Notice: Subject to any disclaimer, the term of this patent is extended or adjusted under 35 U.S.C. 154(b) by 0 days.

(21) Appl. No.: 19/223,493

(22) Filed: May 30, 2025

(65) Prior Publication Data

US 2025/0292731 A1 Sep. 18, 2025

Related U.S. Application Data

(63) Continuation of application No. 18/512,214, filed on Nov. 17, 2023, now Pat. No. 12,361,871.

(30) Foreign Application Priority Data

Dec. 20, 2022 (KR) ........................ 10-2022-0179078

(51) Int. Cl.
*G09G 3/3208* (2016.01)
*G09G 3/20* (2006.01)

(52) U.S. Cl.
CPC ......... *G09G 3/3208* (2013.01); *G09G 3/2011* (2013.01); *G09G 3/2014* (2013.01); *G09G 2310/027* (2013.01)

(58) Field of Classification Search
CPC .. G09G 3/3208; G09G 3/2011; G09G 3/2014; G09G 2310/027
See application file for complete search history.

(56) References Cited

U.S. PATENT DOCUMENTS 7,227,519 B1 6/2007 Kawase et al.
2001/0019319 A1 9/2001 Kim
(Continued)

FOREIGN PATENT DOCUMENTS

KR 20060079018 A 7/2006
KR 20200144050 A 12/2020
KR 20220160368 A 12/2022

OTHER PUBLICATIONS

Korean Office Action for KR Application 10-2022-0179078 issued on Apr. 19, 2024.
(Continued)

*Primary Examiner* — David Tung
(74) *Attorney, Agent, or Firm* — NKL Law; Jae Youn Kim

(57) ABSTRACT

A display device includes a plurality of pixels, the pixel circuit comprising a PWM driving circuit and a PAM driving circuit, wherein the image data comprising a MSB, at least one middle bit, and a LSB, a processor configured to determine whether a single bit value of the MSB of the image data is “0” or “1”, select the PAM driving circuit or the PWM driving circuit based on the MSB the image data, and generate a driving method selection signal to select one of the PAM driving circuit or the PWM driving circuit based on a selection result, wherein, when the MSB of the image data is “1” the PAM driving circuit is selected to express the image data with the MSB being “1”, and when the MSB is “O” the PWM driving circuit is selected to express the image data with the MSB being “0”.

11 Claims, 10 Drawing Sheets

(56) References Cited

U.S. PATENT DOCUMENTS

| | | | | |
|---|---|---|---|---|
| 2020/0043405 | A1 | 2/2020 | Akimoto | |
| 2020/0111404 | A1 | 4/2020 | Kim et al. | |
| 2020/0394953 | A1* | 12/2020 | Kim | G09G 3/32 |
| 2022/0246088 | A1 | 8/2022 | Zhai | |
| 2023/0206813 | A1 | 6/2023 | Kang et al. | |
| 2023/0217561 | A1* | 7/2023 | Kim | G09G 3/3406 315/291 |
| 2023/0230550 | A1 | 7/2023 | Byun et al. | |

OTHER PUBLICATIONS

Korean Office Action for application No. 10-2022-0179078 issued on Sep. 19, 2024; 8 pages.

* cited by examiner

DISPLAY DEVICE WITH COMBINED DRIVING METHODS

CROSS-REFERENCE TO RELATED APPLICATION

This is a continuation of patent application Ser. No. 18/512,241 filed on Nov. 17, 2023, which claims priority from Korean Patent Application No. 10-2022-0179078, filed on Dec. 20, 2022, in the Korean Intellectual Property Office. The contents of these applications are incorporated herein by reference in their entireties.

TECHNICAL FIELD

The present disclosure relates to a display device with combined pixel driving methods.

BACKGROUND

A typical display device includes a plurality of pixels and is configured by arranging M*N pixels. Each of the pixels may include one or more luminous elements, and is generally composed of three luminous elements (R, G, B). Each of the luminous elements is referred to as a sub-pixel.

Meanwhile, a pulse width modulation (PWM) control method using PWM signals is one of the various methods of controlling the driving of sub-pixels, and in recent years, as aspects of circuit design or performance are taken into consideration, the PWM control method has become more commonly used.

However, in order to miniaturize a display or output high-quality images, the size of a luminous element is decreasing, and the size of a pixel is decreasing accordingly. When the size of the pixel decreases, an upper limit of a pixel driving voltage range also decreases, and it may be difficult to implement high levels of color depth in the small drive voltage range.

The related art described above is technical information that the present inventors have possessed in order to derive the present disclosure or have acquired in a process of deriving the present disclosure, and is not necessarily a known technology disclosed to the general public before filing the present disclosure.

BRIEF SUMMARY

An objective of the present disclosure is to provide a display device with combined driving methods. The problem to be solved by the present disclosure is not limited to the above-mentioned problem, and other problems and advantages of the present disclosure not mentioned may be understood by the following description and more clearly understood by the embodiments of the present disclosure. In addition, it will be appreciated that the problems and advantages to be solved by the present disclosure may be realized by means and combinations thereof indicated in the claims.

Additional aspects will be set forth in part in the description which follows and, in part, will be apparent from the description, or may be learned by practice of the presented embodiments of the disclosure.

A first aspect of the present disclosure may provide a display device including a plurality of pixels, wherein each of the plurality of pixels includes a luminous element to express a gradation value of image data and a pixel circuit connected to the luminous element, the pixel circuit comprising a pulse width modulation (PWM) driving circuit and a pulse amplitude modulation (PAM) driving circuit, wherein the image data comprising a most significant bit (MSB), at least one middle bit, and a least significant bit (LSB). The display device may include a processor configured to determine whether a single bit value of the MSB of the image data is "0" or "1", select the PAM driving circuit or the PWM driving circuit based on the single bit value of MSB the image data, generate a driving method selection signal to select one of the PAM driving circuit or the PWM driving circuit based on a selection result, and control light emission of the luminous element by an operation of the PWM driving circuit or an operation of the PAM driving circuit based on the driving method selection signal, wherein, when a value of the MSB of the image data is "1" the PAM driving circuit is selected to express the gradation value of the image data with the MSB being "1", and when the value of the MSB is "0" the PWM driving circuit is selected to express the gradation value of the image data with the MSB being "0".

The pixel circuit may include a switch for electrically connect or disconnect the PAM driving circuit and the PWM driving circuit in response to the driving method selection signal. Each of the plurality of pixels may include a respective processor configured to generate the driving method selection signal based on the single bit value of the MSB of the image data.

A second aspect of the present disclosure provides a display device including a pixel circuit connected to a luminous element to express a gradation value of image data comprising a most significant bit (MSB), at least one middle bit, and a least significant bit (LSB), the pixel circuit comprising a pulse width modulation (PWM) driving circuit and a pulse amplitude modulation (PAM) driving circuit. The display device may include a processor configured to determine whether a single bit value of the MSB of the image data is "0" or "1", select the PAM driving circuit or the PWM driving circuit based on the single bit value of MSB the image data, generate a driving method selection signal to select one of the PAM driving circuit or the PWM driving circuit based on a selection result, and control light emission of the luminous element by an operation of the PWM driving circuit or an operation of the PAM driving circuit based on the driving method selection signal, wherein, when a value of the MSB of the image data is "1" the PAM driving circuit is selected to express the gradation value of the image data with the MSB being "1", and when the value of the MSB is "0" the PWM driving circuit is selected to express the gradation value of the image data with the MSB being "0".

The pixel circuit may further include a switch for electrically connect or disconnect the PAM driving circuit and the PWM driving circuit in response to the driving method selection signal.

A third aspect of the present disclosure provides a display device including a plurality of pixels, wherein each of the plurality of pixels includes a pulse width modulation (PWM) driving circuit and a pulse amplitude modulation (PAM) driving circuit and drives light emission of a luminous element by an operation of the PWM driving circuit or the PAM driving circuit based on a driving method selection signal, a lookup table containing correspondence between gradation representation bit values and region representation bit values, a bit converter configured to convert image data into a combination of region representation bits and gradation representation bits by referring to the lookup table, and a processor configured to generate the driving method selection signal to select one of the PAM driving circuit to express the gradation representation bits when the region representation bits indicate a high-gradation region or the PWM driving circuit to express the gradation representation bits when the region representation bits indicate a low-gradation region.

The processor may be further configured to convert image data with a size of n bits into region representation bits with a size of 2 bits and gradation representation bits with a size of n/2 bits. The region representation bits may be determined to represent which region of a first region, a second region, a third region, and a fourth region the image data belongs to, and the first region, the second region, the third region, and the fourth region are formed by dividing an entire gradation region including 2n gradations represented by n bits. When the region representation bits are "00," the image data belongs to the first region, when the region representation bits are "01," the image data belongs to the second region, when the region representation bits are "10," the image data belongs to the third region, and when the region representation bits are "11," the image data belongs to the fourth region. The driving method selection signal may be generated such that a pixel circuit of each pixel drives light emission of the luminous element by an operation of the PWM driving circuit when the region representation bits are one of "00," "01," or "10," and the driving method selection signal may be generated such that the pixel circuit of each pixel drives light emission of the luminous element by an operation of the PAM driving circuit when the region representation bits are "11."

The first region, the second region, the third region, and the fourth region may be formed by dividing the entire gradation region from low gradation to high gradation into ratios of ⅛, ⅛, ¼, and ½, which are respectively assigned thereto. Each pixel may include a luminous element, and a pixel circuit connected to the luminous element, wherein the pixel circuit includes a pulse width modulation (PWM) driving circuit and a pulse amplitude modulation (PAM) driving circuit and drives light emission of the luminous element by an operation of the PWM driving circuit or the PAM driving circuit based on the driving method selection signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
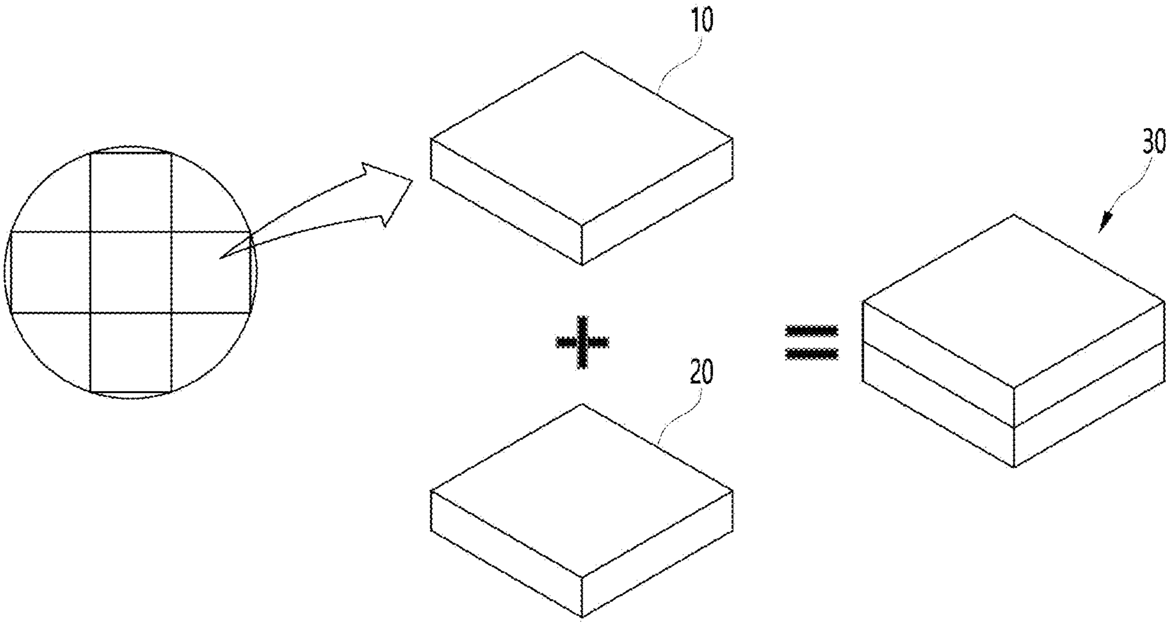
FIG. 1 is a diagram schematically illustrating a manufacturing process of a display device according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The effects and features of the present disclosure and the accompanying methods thereof will become apparent from the following description of the embodiments, taken in conjunction with the accompanying drawings. However, it should be understood that the present disclosure is not limited to the embodiments presented below, but may be implemented in various other forms and includes all transformations, equivalents, and substitutes included in the spirit and scope of the present disclosure. It should be understood, however, that the description of the embodiments is provided to enable the present disclosure to be complete, and will fully convey the scope of the disclosure to one of ordinary skill in the art to which the present disclosure belongs. In describing the present disclosure, when it is determined that a detailed description of a related known technology may obscure the gist of the present disclosure, the detailed description thereof will be omitted.

The terms used in the embodiments have been selected from general terms that are currently widely used when possible but may vary according to an intention of those of ordinary skill in the art, precedents, or the emergence of new technologies. In addition, the applicant may arbitrarily select terms in a particular case, and in this case, the meaning of the terms will be described in detail in the corresponding part. Accordingly, the terms used herein should be defined on the basis of the meaning of the terms and the content throughout the specification, instead of the names of the terms.

The terms used in the present application are used to describe only specific embodiments or examples, and are not intended to limit the present disclosure. A singular expression includes a plural expression as long as it does not have an apparently different meaning in context. In the present application, the terms "include" or "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

In addition, terms including ordinal numbers such as "first" or "second" used herein may be used to describe various components, but the components are not limited by the terms, and the terms are used only for the purpose of distinguishing one component from another. These terms may be used for the purpose of distinguishing one component from another component.

In the following embodiments, the term "on" used in connection with an element state may refer to an activated state of an element, and the term "off" used in connection with the element state may refer to a deactivated state of the element. The term "on" used in connection with a signal received by the element may refer to a signal that activates the element, and the term "off" used in connection with the signal received by the element may refer to a signal that deactivates the element. The element may be activated by a high voltage or a low voltage. For example, a P-type transistor is activated by a low voltage. An N-type transistor is activated by a high voltage. Thus, it should be understood that an "on" voltage of the P-type transistor has an opposite (low to high) voltage level with respect to an "on" voltage of the N-type transistor.

It should be understood that when an element is referred to as being "connected to another element, it can be directly connected to another element or intervening elements may be present.

Hereinafter, at least part of the elements of display device described below may include a processor, an application-specific integrated circuit (ASIC), another chipset, a logic circuit, a register, a communication modem, or a data processing device and the like, which are known in the art to execute various control logic described above. In addition, when the above-described control logic is implemented in software, the part of the elements may be implemented as a set of program modules. The program modules may be stored in a memory device and executed by the processor.

Hereinafter, embodiments of the present disclosure will be described in detail with reference to the accompanying drawings.

In addition, in describing embodiments of the present disclosure, when detailed descriptions of related known configurations or features are deemed to unnecessarily blur the gist of the present disclosure, the detailed description will be omitted.

FIG. 1 is a diagram schematically illustrating a manufacturing process of a display device according to an embodiment of the present disclosure.

Referring to FIG. 1, a display device 30 according to an embodiment may include a luminous element array 10 and a driving circuit board 20. The luminous element array 10 may be coupled to a driving circuit board 20.

The luminous element array 10 may include a plurality of luminous elements. The luminous elements may be light-emitting diodes (LEDs). At least one luminous element array may be manufactured by growing a plurality of LEDs on a semiconductor wafer (SW). Accordingly, the display device 30 may be manufactured by coupling the luminous element array 10 with the driving circuit board 20, without the need to individually transfer the LED to the driving circuit board 20.

Pixel circuits respectively corresponding to the luminous elements on the luminous element array 10 may be arranged on the driving circuit board 20. The luminous element on the luminous element array 10 and the pixel circuit on the driving circuit board 20 may be electrically connected to form a pixel PX.

Figure 2:
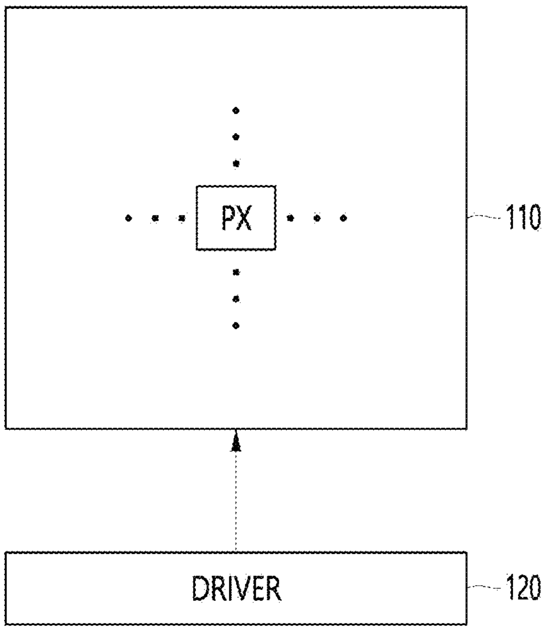
FIG. 2 is a diagram schematically illustrating a display device according to an embodiment of the present disclosure.

FIG. 2 is a diagram schematically illustrating a display device according to an embodiment of the present disclosure.

Referring to FIG. 2, the display device may include a pixel unit 110 and a driver 120. The display device of FIG. 2 may correspond to the display device 30 described above with reference to FIG. 1.

The pixel unit 110 may display an image by using an n-bit digital image signal capable of displaying 1 to $2^n$ gray scales. The pixel unit 110 may include a plurality of pixels PX arranged in a certain pattern, for example, a matrix-type pattern, a zigzag-type pattern, or the like. Each of the pixels PX emits light of a single color, and may emit, for example, light of one of red, blue, green, and white. The pixel PX may emit light of other colors than red, blue, green, and white.

The pixel PX may include a luminous element. The luminous element may be a self-luminous element. For example, the luminous element may be an LED. The luminous element may be a micro-scale or nano-scale LED. The luminous element may emit light having a single peak wavelength or may emit light having a plurality of peak wavelengths.

The pixel PX may further include a pixel circuit connected to the luminous element. The pixel circuit may be implemented by a semiconductor stacked structure on a substrate.

The driver 120 may drive and control the pixel unit 110. The driver 120 may include a controller (not shown), a gamma setting unit (not shown), a data driver (not shown), a current supplier (not shown), a clock generator (not shown), and a driving method selector (not shown), which will be described in more detail below.

The driver 120 or some part of the driver 120 of this disclosure may include a processor, an application-specific integrated circuit (ASIC), another chipset, a logic circuit, a register, a communication modem, or a data processing device and the like and operations of the driver 120 or some part of the driver 120 of this disclosure may be implemented as a set of program modules which may be executed by the processor.

Figure 3:
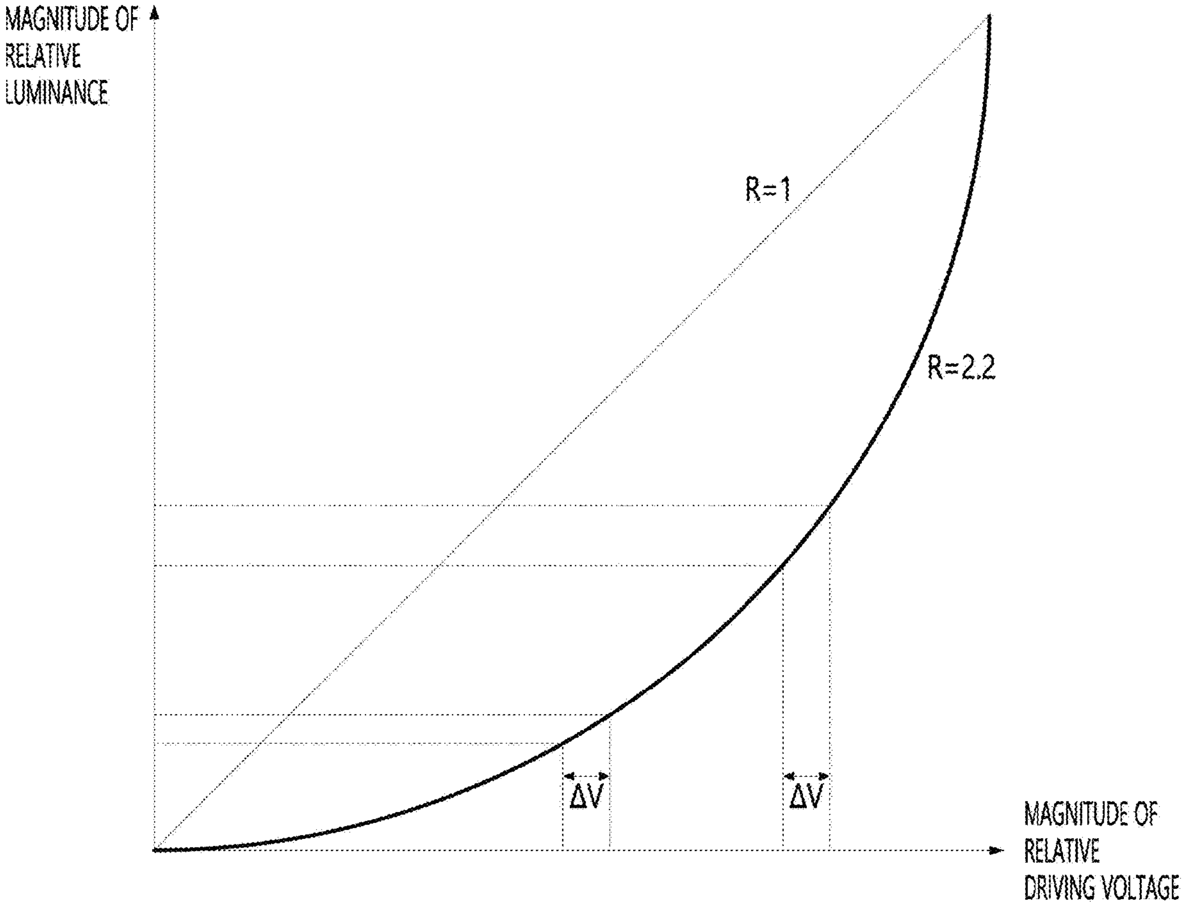
FIG. 3 is a diagram illustrating a gamma curve for different gamma values.

FIG. 3 is a diagram illustrating a gamma curve for different gamma values.

Referring to FIG. 3, the gamma curve may be expressed as luminance according to a driving voltage. Meanwhile, in FIG. 3, the x-axis is set to a magnitude of a relative driving voltage, but the x-axis may represent a gray scale, and even in this case, a graph having the same shape as that shown in FIG. 3 may be obtained. In addition, the x-axis and the y-axis may represent an input gradation value and an output gradation value, respectively, and even in this case, a graph having the same shape as that shown in FIG. 3 may be obtained.

Referring to FIG. 3, unlike a case in which a gamma value R is 1, in a case in which the gamma value R is 2.2, the increase in output luminance with increasing input is not large in a low-gradation region (i.e., a low voltage region), but is larger toward a high-gradation region (i.e., a high voltage region). In other words, for the same voltage difference $\Delta V$, the difference in output brightness values is different between the low- and high-gradation regions.

In other words, the high-gradation region may produce a difference in output luminance even with a small voltage difference as compared to the low-gradation region. Accordingly, the same method may not necessarily be applied for the low- and high-gradation regions, and with this in mind, in the present disclosure, an embodiment is provided in which different driving methods are applied for the low- and high-gradation regions or a method of distinguishing gradations with different intervals is applied.

Figure 4:
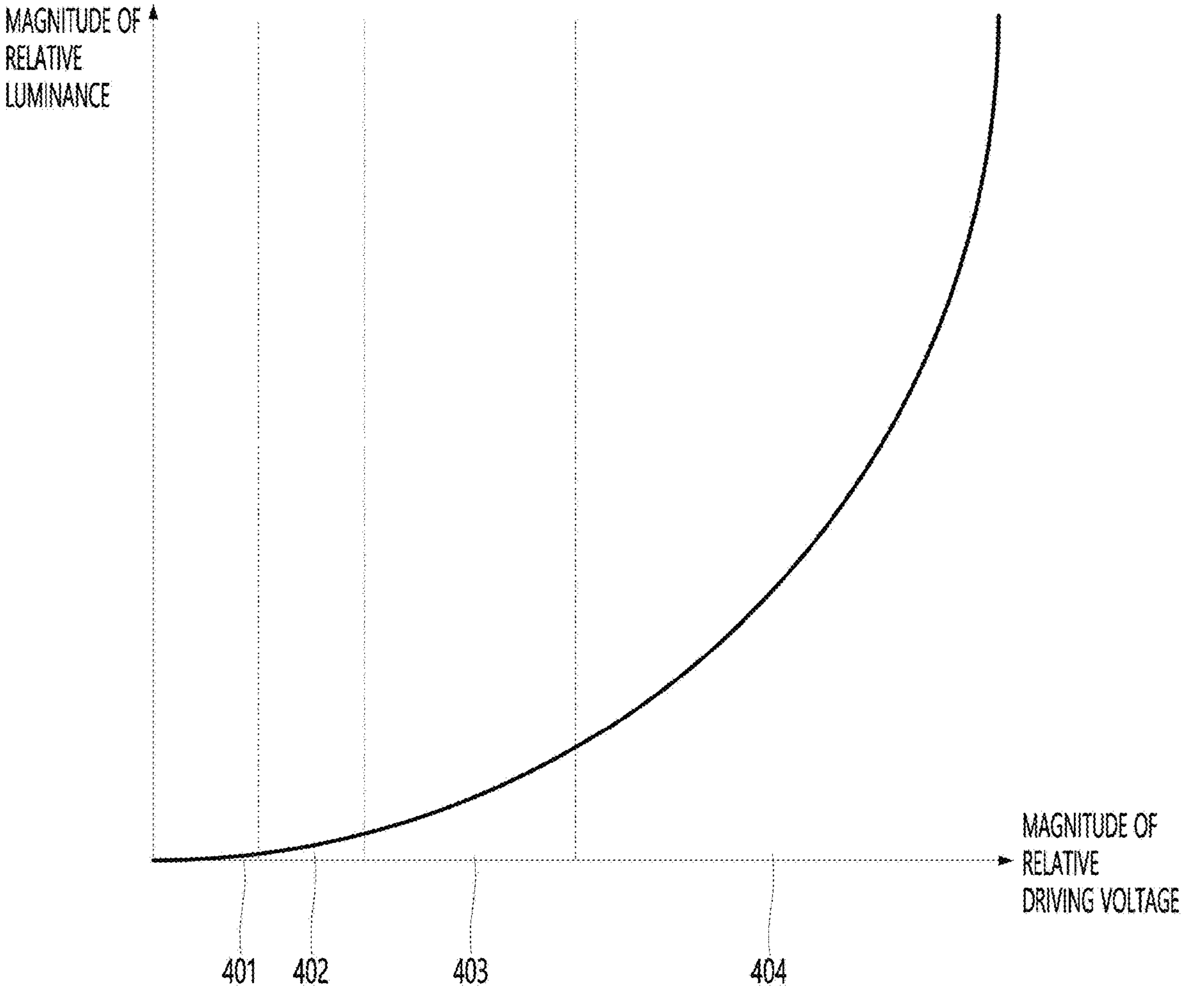
FIG. 4 is a diagram for describing a gradation region division according to an embodiment of the present disclosure.

FIG. 4 is a diagram for describing a gradation region division according to an embodiment of the present disclosure.

Referring to FIG. 4, a gamma curve for the gamma value R of 2.2 is illustrated.

In an embodiment, the entire gradation region may be divided into a high-gradation region and a low-gradation region.

Specifically, image data of n bits may express a gray scale with $2^n$ gradation numbers, which means that 2n values may be used to represent luminance from 0% to 100% through the image data of n bits. In this case, the entire gradation region may refer to all of $2^n$ gradations (i.e., x-axis values in FIG. 4) corresponding to $2^n$ gray scales. An interval between each gradation of the gradation region is generally set to be equal to each other, and thus, when the interval between each gradation (hereinafter referred to as a "gradation interval") is "1," the entire gradation region may have gradations [0, 1, 2, . . . , and $2^n-1$], corresponding to the image data of n bits. For example, when n is "16," the entire gradation region may be divided to have gradations [0, 1, 2, . . . , and 65535] and represented with a total of 65,536 gradation numbers.

In the case of image data of n bits, the entire gradation region corresponding to the $2^n$ gradations may be divided into a high-gradation region and a low-gradation region based on a specific gradation. In an embodiment, the high-gradation region and the low-gradation region may be divided by halving the entire $2^n$ gradations. That is, when the gradation interval is "1," the low-gradation region may have gradations [0, 1, 2, . . . , and $2^n/2-1$], and the high-gradation region may have gradations [$2^n/2$, $2^n/2+1$, $2^n/2+2$, . . . , and $2^n-1$]. In an example in which n is "16," the low-gradation region may be subdivided to have gradations [0, 1, 2, . . . , and 32767] and represented with 32,768 gradation numbers out of a total of 65,536 gradation numbers, and the high-gradation region may be subdivided to have gradations [32768, 32769, 32770, . . . , and 65535] and represented with the remaining 32,768 gradation numbers out of the total of 65,536 gradation numbers.

In an embodiment, dividing the entire gradation region into the high-gradation region and the low-gradation region may be intended to apply different driving methods to the high-gradation region and the low-gradation region, which will be described later.

In an embodiment, the entire gradation region may be divided into four regions.

Referring to FIG. 4, the entire gradation region may be divided into a first region 401, a second region 402, a third region 403, and a fourth region 404.

In an embodiment, the entire gradation region, consisting of $2^n$ gradations, may be divided from low gradation to high gradation into ratios of ⅛, ⅛, ¼, and ½, with the first region 401, the second region 402, the third region 403, and the fourth region 404 being assigned therein, respectively. That is, in the case of image data of n bits, when the gradation interval is "1," the first region 401 may have gradations [0, 1, 2, . . . , and $2^n/8-1$], the second region 402 may have gradations [$2^n/8$, $2^n/8+1$, $2^n/8+2$, . . . , and $2^n/4-1$], the third region 403 may have gradations [$2^n/4$, $2^n/4+1$, $2^n/4+2$, . . . , and $2^n/2-1$], and the fourth region 404 may have gradations [$2^n/2$, $2^n/2+1$, $2^n/2+2$, . . . , and $2^n-1$]. In an example in which n is "16," the first region 401 may be subdivided to have gradations [0, 1, 2, . . . , and 8191], which may be represented by 8,192 gradation numbers out of a total of 65,536 gradation numbers, the second region 402 may be subdivided to have gradations [8192, 8193, 8194, . . . , and 16383], which may be represented by 8,192 gradation numbers out of the total of 65,536 gradation numbers, the third region 403 may be subdivided to have gradations [16384, 16385, 16386, . . . , and 32767], which may be represented by 16,384 gradation numbers out of the total of 65,536 gradation numbers, and the fourth region 404 may be subdivided to have gradations [32768, 32769, 32770, . . . , and 65535], which may be represented by 32,768 gradation numbers out of the total of 65,536 gradation numbers.

In an embodiment, dividing the entire gradation region into four regions may be intended to apply a different driving method to each area and allocate region representation bits for each area, which will be described later.

In addition to the methods described above, the entire gradation region may be divided into four regions in any suitable method.

In an embodiment of the present disclosure, gradation reassignment may be performed for each of a plurality of regions generated by dividing. For example, the gradation reassignment may be performed such that each of the plurality of regions has $2^n/2$ gradations. This will be described later.

Figure 5:
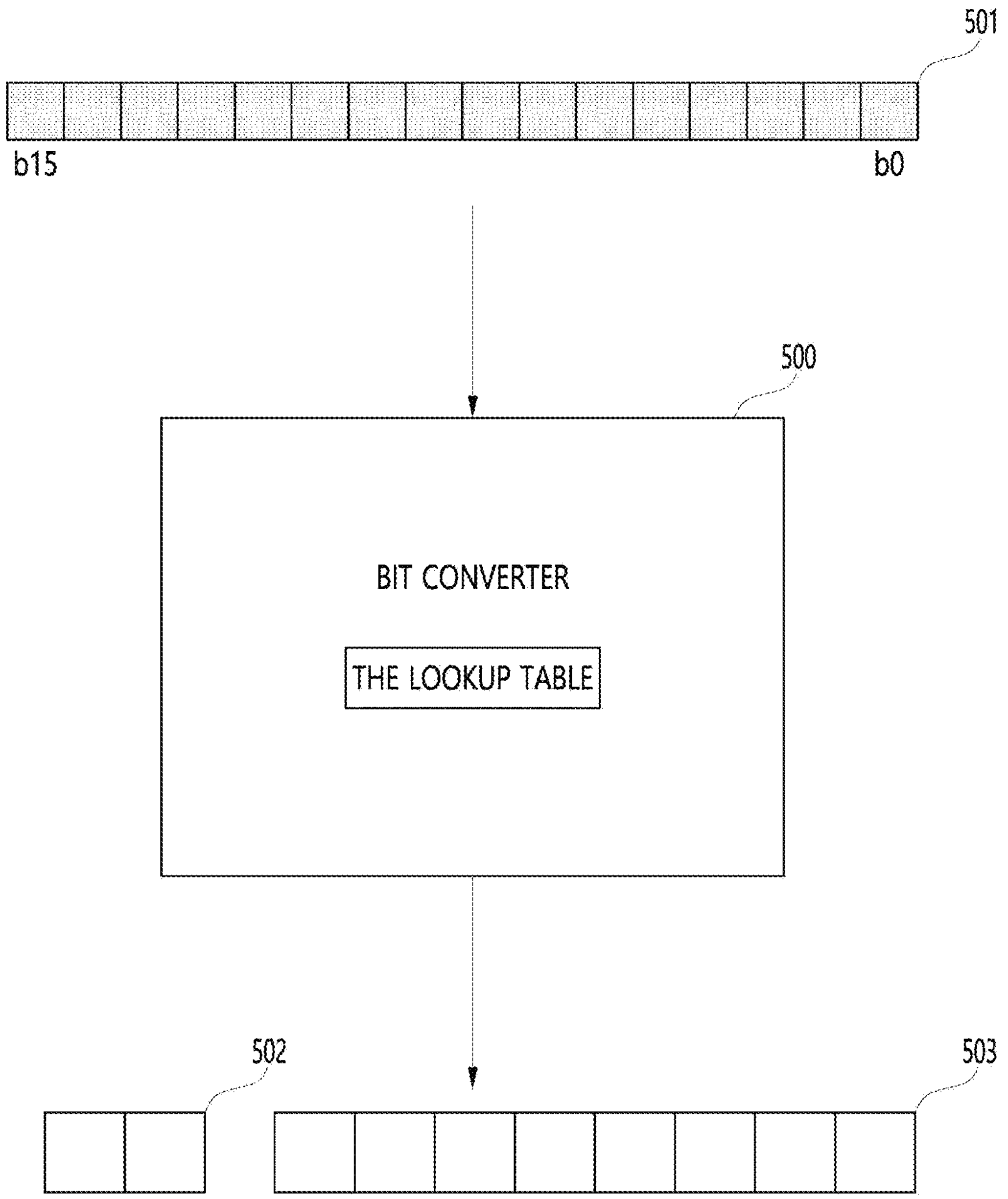
FIG. 5 is a schematic diagram for describing a bit conversion process of image data according to an embodiment of the present disclosure.

FIG. 5 is a schematic diagram for describing a bit conversion process of image data according to an embodiment of the present disclosure.

Referring to FIG. 5, a bit converter 500 may receive image data 501 and generate image data converted based on the image data 501. The converted image data may include region representation bits 502 and gradation representation bits 503. In the present disclosure, the region representation bits 502 may refer to bits that allow one of a plurality of regions, which are generated by dividing the entire gradation region on the basis of the input image data 501, to be identified. That is, the region representation bits 502 correspond a value that may indicate which region of the plurality of divided regions the image data 501 belongs to. In the present disclosure, the gradation representation bits 503 may refer to bits for representing gradation in each region, as will be described below.

As described above with reference to FIG. 4, the entire gradation region may be divided into four regions, which are the first region, the second region, the third region, and the fourth region. The region representation bits 502 may be used to identify one of the four regions, and for this purpose, two-bit data is required, so that the size of the region representation bits 502 may be two bits. The region representation bits 502 of two bits may have one of "00," "01," "10," and "11," which may correspond to the first region, the second region, the third region, and the fourth region, respectively. In other words, the region representation bits 502 of two bits may be determined to correspond to one of the first region, the second region, the third region, and the fourth region. For example, when the region representation bits 502 have "00," which may mean the first region, when the region representation bits 502 have "01," which may mean the second region, when the region representation bits 502 have "10," which may mean the third region, and when the region representation bits 502 have "11," which may mean the fourth region.

In an embodiment, the bit converter 500 may determine the region representation bits 502 based on the received image data 501. Specifically, the bit converter 500 may determine which region the image data 501 is included, and determine the region representation bits 502. Specifically, in an example in which the entire $2^n$ gradations are divided from low gradation to high gradation into ratios of ⅛, ⅛, ¼, and ½, with the first region, the second region, the third region, and the fourth region being assigned therein, respectively, the region representation bits 502 may have "00" when a bit value of the image data 501 is included in one of the gradations [0, 1, 2, . . . , and $2^n/8-1$], the region representation bits 502 may have "01" when the bit value of the image data 501 is included in one of the gradations [$2^n/8$, $2^n/8+1$, $2^n/8+2$, . . . , and $2^n/4-1$], the region representation bits 502 may have "10" when the bit value of the image data 501 is included in one of the gradations [$2^n/4$, $2^n/4+1$, $2^n/4+2$, . . . , and $2^n/2-1$], and the region representation bits 502 may have "11" when the bit value of the image data 501 is included in one of the gradations [$2^n/2$, $2^n/2+1$, $2^n/2+2$, . . . , and $2^n-1$].

In an embodiment, the bit converter 500 may determine the gradation representation bits 503 based on the received image data 501. Specifically, the bit converter 500 may determine the gradation representation bits 503 by determining which of the n/2-bit basis values the n-bit basis gradation corresponding to the image data 501 corresponds to. Hereinafter, an embodiment of a process of determining the gradation representation bits 503 will be described in detail.

As described above with reference to FIG. 4, in an embodiment, gradation reassignment may be performed for each of the plurality of regions generated by dividing the entire gradation region. Since the size of the image data 501 is greater than the size of the gradation representation bits 503, the number of gradations represented by the image data 501 is greater than the number of gradations represented by the gradation representation bits 503, and thus one-to-one mapping between the image data 501 and the gradation representation bits 503 is not possible. Accordingly, gradation reassignment may be performed for each of the plurality of regions generated by dividing. In an embodiment, the gradation reassignment may be performed such that each of the plurality of regions generated by dividing the entire gradation region, which may be represented by the n-bit image data 501, has $2^n/2$ gradations.

Specifically, in the example in which the entire $2^n$ gradations are divided from low gradation to high gradation into ratios of ⅛, ⅛, ¼, and ½, with the first region, the second region, the third region, and the fourth region being assigned therein, respectively, the gradation reassignment is performed such that the first region, which had the gradations [0, 1, 2, . . . , and $2^n/8-1$] based on the image data of n bits, has $2^n/2$ gradations, the gradation reassignment is performed such that the second region, which had the gradations [$2^n/8$, $2^n/8+1$, $2^n/8+2$, . . . , and $2^n/4-1$] based on the image data of n bits, also has $2^n/2$ gradations, the gradation reassignment is performed such that the third region, which had the gradations [$2^n/4$, $2^n/4+1$, $2^n/4+2$, . . . , and $2^n/2-1$] based on the image data of n bits, also has $2^{n/2}$ gradations, and the gradation reassignment is performed such that the fourth region, which had the gradations [$2^n/2$, $2^n/2+1$, $2^n/2+2$, . . . , and $2^n-1$] based on the image data of n bits, also has $2^n/2$ gradations. In the present embodiment, each region may individually have a gradation interval, and the gradation interval of each of the first and second regions may be $$\frac{2^n/8}{2^{n/2}},$$

the gradation interval of the third region may be $$\frac{2^n/4}{2^{n/2}},$$

and the gradation interval of the fourth region may be $$\frac{2^n/2}{2^{n/2}}.$$

In an embodiment, as a result of the gradation reassignment being performed. The first region may have gradations $$\left[0,\ 0+\frac{2^n/8}{2^{n/2}},\ 0+\frac{2^n/8}{2^{n/2}}\times 2,\ \ldots\ ,\text{ and }0+\frac{2^n/8}{2^{n/2}}\times\left(2^{\frac{n}{2}}-1\right)\right],$$

the second region may have gradations $$\left[\frac{2^n}{8},\ \frac{2^n}{8}+\frac{2^n/8}{2^{n/2}},\ \frac{2^n}{8}+\frac{2^n/8}{2^{n/2}}\times 2,\ \ldots\ ,\text{ and }0+\frac{2^n/8}{2^{n/2}}\times\left(2^{\frac{n}{2}}-1\right)\right],$$

the third region may have gradations $$\left[\frac{2^n}{4},\ \frac{2^n}{4}+\frac{2^n/4}{2^{n/2}},\ \frac{2^n}{4}+\frac{2^n/4}{2^{n/2}}\times 2,\ \ldots\ ,\text{ and }\frac{2^n}{4}+\frac{2^n/4}{2^{n/2}}\times\left(2^{\frac{n}{2}}-1\right)\right],$$

and the fourth region may have gradations $$\left[\frac{2^n}{2},\ \frac{2^n}{2}+\frac{2^n/2}{2^{n/2}},\ \frac{2^n}{2}+\frac{2^n/2}{2^{n/2}}\times 2,\ \ldots\ ,\text{ and }\frac{2^n}{2}+\frac{2^n/2}{2^{n/2}}\times\left(2^{\frac{n}{2}}-1\right)\right].$$

In a more specific example, in the example in which n is "16," the gradation reassignment may be performed such that the first region, which had the gradations [0, 1, 2, . . . , and 8191], has gradations [0, 32, 64, . . . , and 8160], the gradation reassignment may be performed such that the second region, which had the gradations [8192, 8193, 8194, . . . , and 16383], has gradations [8192, 8224, 8256, . . . , and 16352], the gradation reassignment may be performed such that the third region, which had the gradations [16384, 16385, 16386, . . . , and 32767], has gradations [16384, 16448, 16512, . . . , and 32704], and the gradation reassignment may be performed such that the fourth region, which had the gradations [32768, 32769, 32770, . . . , and 65535], has gradations [32768, 32896, 33024, . . . , and 65408].

When the gradation reassignment is performed as described above, since each region has $2^{n/2}$ gradations, the gradation may be represented by n/2 bits, according to which the bit converter 500 may determine the gradation representation bits 503. Specifically, the reassigned gradations $$\left[0,\ 0+\frac{2^n/8}{2^{n/2}},\ 0+\frac{2^n/8}{2^{n/2}}\times 2,\ \ldots\ ,\text{ and }0+\frac{2^n/8}{2^{n/2}}\times\left(2^{\frac{n}{2}}-1\right)\right]$$

of the first region may respectively correspond to 0, 1, 2, . . . , and 255 of the gradation representation bits 503. Similarly, the reassigned gradations $$\left[\frac{2^n}{8}, \frac{2^n}{8} + \frac{2^n/8}{2^{n/2}}, \frac{2^n}{8} + \frac{2^n/8}{2^{n/2}} \times 2, \ldots \text{, and } 0 + \frac{2^n/8}{2^{n/2}} \times \left(2^{\frac{n}{2}} - 1\right)\right]$$

of the second region may also respectively correspond to 0, 1, 2, . . . , and 255 of the gradation representation bits 503, the gradations $$\left[\frac{2^n}{4}, \frac{2^n}{4} + \frac{2^n/4}{2^{n/2}}, \frac{2^n}{4} + \frac{2^n/4}{2^{n/2}} \times 2, \ldots \text{, and } \frac{2^n}{4} + \frac{2^n/4}{2^{n/2}} \times \left(2^{\frac{n}{2}} - 1\right)\right]$$

of the third region may also respectively correspond to 0, 1, 2, . . . , and 255 of the gradation representation bits 503, and the gradations $$\left[\frac{2^n}{2}, \frac{2^n}{2} + \frac{2^n/2}{2^{n/2}}, \frac{2^n}{2} + \frac{2^n/2}{2^{n/2}} \times 2, \ldots \text{, and } \frac{2^n}{2} + \frac{2^n/2}{2^{n/2}} \times \left(2^{\frac{n}{2}} - 1\right)\right]$$

of the fourth region may also respectively correspond to 0, 1, 2, . . . , and 255 of the gradation representation bits 503.

Summarizing the above described contents, in an embodiment, the gradation belonging to the first region may be represented by the region representation bits 502 having "00" and the gradation representation bits 503 having one of "00000000" (0) to "11111111" (255), the gradation belonging to the second region may be represented by the region representation bits 502 having "01" and the gradation representation bits 503 having one of "00000000" (0) to "11111111" (255), the gradation belonging to the third region may be represented by the region representation bits 502 having "10" and the gradation representation bits 503 having one of "00000000" (0) to "11111111" (255), and the gradation belonging to the fourth region may be represented by the region representation bits 502 having "11" and the gradation representation bits 503 having one of "00000000" (0) to "11111111" (255).

Referring to FIG. 5, the bit converter 500 may receive the image data 501 with a size of 16 bits and convert the image data 501 into the region representation bits 502 with a size of 2 bits and the gradation representation bits 503 with a size of 8 bits.

In an embodiment, the bit converter 500 may determine the region representation bits 502 and the gradation representation bits 503 based on the image data 501 through the above-described embodiments, and a correspondence relationship between the image data 501, the region representation bits 502, and the gradation representation bits 503 may be stored in a lookup table. The lookup table may contain correspondence between gradation representation bit values and region representation bit values. That is, in an embodiment, when image data 501 is input, the bit converter 500 may output the region representation bits 502 and the gradation representation bits 503, which correspond thereto, by referring to the lookup table. In this way, the bit converter 500 may convert image data into a combination of region representation bits and gradation representation bits by referring to the lookup table.

Meanwhile, in an embodiment, when the image data 501 does not match one of the reassigned gradations, for example, when the image data 501 has "0000000000001111" (31), The image data 501 may consider this value to correspond to an adjacent gradation, and determine the region representation bits 502 and the gradation representation bits 503. In an embodiment, when the image data 501 does not match one of the reassigned gradations, the image data 501 may be considered as one of a large value or a small value of the adjacent gradation. In an embodiment, when the image data 501 does not match one of the reassigned gradations, the image data 501 may be considered as one of adjacent gradations with a smaller difference. As described above, a correspondence relationship between the image data 501, the region representation bits 502, and the gradation representation bits 503 in a case in which the image data 501 does match one of the reassigned gradations may also be stored in the lookup table.

The process of determining the region representation bits 502 and the gradation representation bits 503 may be performed in a different manner unlike the above-described embodiment. For example, a detailed reassignment process may be different (e.g., the first region is reassigned to have gradations $$\left[-1 + \frac{2^n/8}{2^{n/2}}, -1 + \frac{2^n/8}{2^{n/2}} \times 2, , \ldots \text{, and } -1 + \frac{2^n}{8}\right].$$

For example, the size of the region representation bits 502 or the size of the gradation representation bits 503 may be different. For example, the entire gradation region may be divided into eight regions, and in this case, the size of the region representation bits 502 may be three bits.

As the bit converter 500 determines the region representation bits 502 and the gradation representation bits 503 on the basis of the image data 501, i.e., converts the image data 501 into the region representation bits 502 and the gradation representation bits 503, the gradation assignment may be performed unequally for the low- and high-gradation regions, so that limited resources may be efficiently used. In an embodiment, the image data 501 may be n bits, the size of the region representation bits 502 may be two bits, and the size of the gradation representation bits 503 may be n/2 bits, and in this case, a 2+n/2-bit memory may be used instead of an n-bit memory. Specifically, when n is "16," a 10-bit memory may be used instead of a 16-bit memory.

The bit converter 500 of this disclosure may include a processor, an application-specific integrated circuit (ASIC), another chipset, a logic circuit, a register, a communication modem, or a data processing device and the like and operations of the bit converter 500 of this disclosure may be implemented as a set of program modules which may be executed by the processor.

Figure 6:
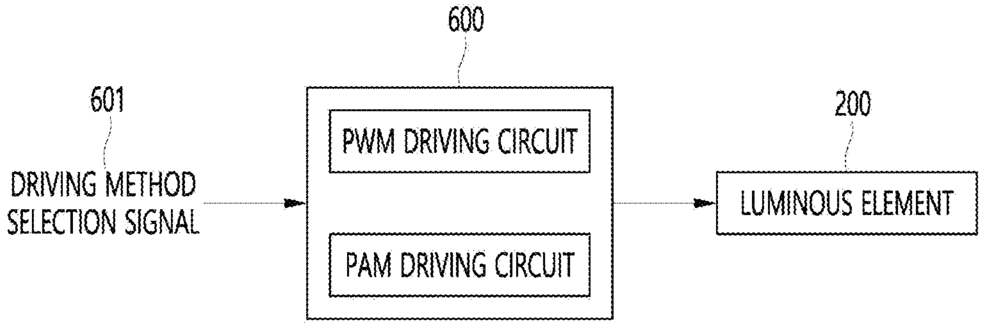
FIG. 6 is a schematic diagram for describing a process of applying different driving methods according to an embodiment of the present disclosure.

FIG. 6 is a schematic diagram for describing a process of applying different driving methods according to an embodiment of the present disclosure.

Referring to FIG. 6, a pixel circuit 600 is illustrated, which drives light emission of a luminous element 200.

In an embodiment, the pixel circuit 600 may include a pulse width modulation (PWM) driving circuit and a pulse amplitude modulation (PAM) driving circuit. The pixel circuit 600 of the present disclosure may drive light emission of the luminous element 200 through one of a PWM driving method and a PAM driving method. The pixel circuit 600 of the present disclosure may include both the PWM driving circuit and the PAM driving circuit, and may drive the luminous element 200 by operating one of the PWM driving circuit or the PAM driving circuit according to a predetermined condition.

In an embodiment, the pixel circuit 600 may operate one of the PWM driving circuit and the PAM driving circuit on the basis of a driving method selection signal 601. In an embodiment, the driving method selection signal 601 may be generated by a driving method selector, as will be described below. In another embodiment, the driving method selection signal 601 may be determined by a most significant bit (MSB) of image data, as will be described below. A specific process for forming the driving method selection signal 601 will be described below.

In an embodiment, the pixel circuit 600 may include a switch (not shown) that electrically connects or disconnects the PWM driving circuit and the PAM driving circuit. Thus, in an embodiment, the switch that may be included in the pixel circuit 600 may electrically connect or disconnect the PWM driving circuit and the PAM driving circuit in response to the driving method selection signal.

Figure 7:
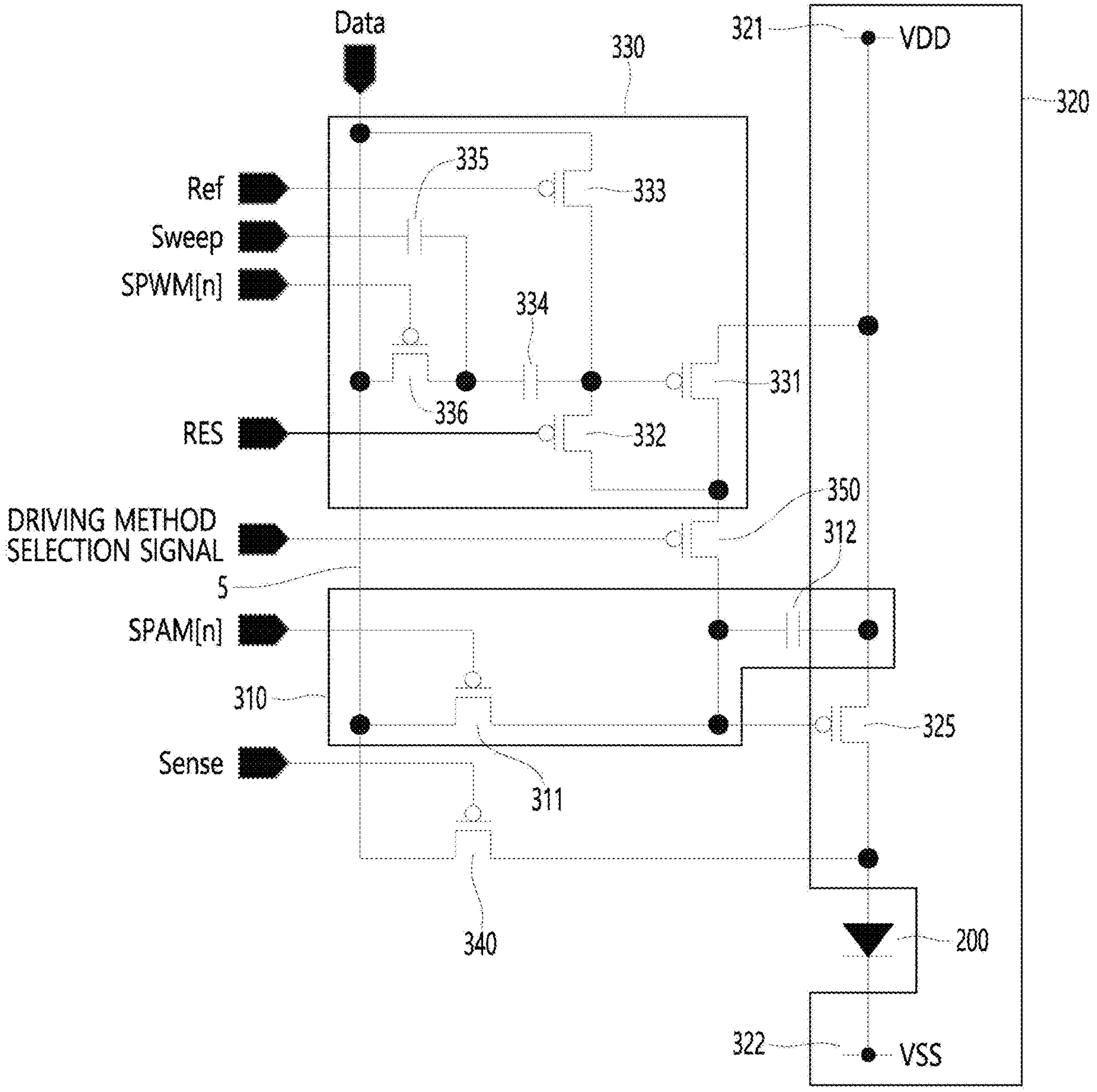
FIG. 7 is a diagram illustrating a pixel circuit and a luminous element according to an embodiment of the present disclosure.

FIG. 7 is a diagram illustrating a pixel circuit and a luminous element according to an embodiment of the present disclosure.

As described above, the pixel PX may include the luminous element 200 and a pixel circuit connected to the luminous element 200. The pixel circuit may be the pixel circuit 600 illustrated in FIG. 6. The pixel circuit may include a PAM driving circuit 310, a current source 320, a first transistor 325, a PWM driving circuit 330, a second transistor 340, and an eighth transistor 350.

The PAM driving circuit 310 may apply a voltage input via a data line 5 to a gate terminal of the first transistor 325. To this end, the PAM driving circuit 310 may include a third transistor 311 having a source terminal connected to the data line 5 and a drain terminal connected to the gate terminal of the first transistor 325, and a first capacitor 312 having a first end connected to a source terminal of the first transistor 325 and a second end commonly connected to the gate terminal of the first transistor 325 and the drain terminal of the third transistor 311.

Thus, while the third transistor 311 is turned on in response to a control signal SPAM(n), when an amplitude setting voltage PAM Data is input via the data line 5, the PAM driving circuit 310 may charge the input amplitude setting voltage to the first capacitor 312 and apply the voltage charged to the first capacitor 312 to the gate terminal of the first transistor 325.

Meanwhile, as shown in FIG. 7, the source terminal of the first transistor 325 is commonly connected to the first end of the first capacitor 312 and a driving voltage terminal 321 of the pixel circuit. A drain terminal of the first transistor 325 is connected to an anode of the luminous element 200. A cathode of the luminous element 200 may be connected to a ground voltage terminal 322 of the pixel circuit.

Accordingly, in a state in which a driving voltage VDD is applied to the driving voltage terminal 321 and the voltage charged in the first capacitor 312 is applied to the gate terminal of the first transistor 325, when a voltage of the ground voltage terminal 322 becomes a ground voltage VSS, the current source 320 may provide a driving current, which has an amplitude corresponding to a magnitude of the voltage charged in the first capacitor 312, to the luminous element 200.

The eighth transistor 350 may be a switch that may electrically connect or disconnect the PWM driving circuit 330 and the PAM driving circuit 310. Specifically, as shown in FIG. 7, the eighth transistor 350 may have a drain terminal connected to the gate terminal of the first transistor 325, and a source terminal commonly connected to a drain terminal of a fourth transistor 331 and a drain terminal of a fifth transistor 332. The eighth transistor 350 may electrically connect or disconnect the PAM driving circuit 310 and the PWM driving circuit 330 in response to the driving method selection signal.

Meanwhile, when a pulse width setting voltage for determining a pulse width of the driving current is applied via the data line 5, the PWM driving circuit 330 may control a gate terminal voltage of the first transistor 325 on the basis of the pulse width setting voltage. To this end, the PWM driving circuit 330 may include the fourth transistor 331, the fifth transistor 332, a sixth transistor 333, a second capacitor 334, a third capacitor 335, and a seventh transistor 336.

The fifth transistor 332 is connected between a gate terminal and the drain terminal of the fourth transistor 331. A source terminal of the sixth transistor 333 is connected to the data line 5, and a drain terminal of the sixth transistor 333 is commonly connected to the gate terminal of the fourth transistor 331 and a source terminal of the fifth transistor 332. A first end of the second capacitor 334 is commonly connected to the gate terminal of the fourth transistor 331, the source terminal of the fifth transistor 332, and the drain terminal of the sixth transistor 333. A first end of the third capacitor 335 receives a sweep signal, and a second end of the third capacitor 335 is connected to a second end of the second capacitor 334. A source terminal of the seventh transistor 336 is connected to the data line 5, and a drain terminal of the seventh transistor 336 is commonly connected to the second end of the second capacitor 334 and the second end of the third capacitor 335. An eighth transistor 350 may be connected between the gate terminal of the first transistor 325 and the drain terminal of the fourth transistor 331.

Accordingly, a gate terminal voltage of the fourth transistor 331 is set to a voltage based on a threshold voltage of the fourth transistor 331 while the fifth transistor 332 is turned on. Thereafter, while the seventh transistor 336 is turned on in response to a control signal SPWM (n), when a pulse width setting voltage PWM Data is input via the data line 5, the gate terminal voltage of the fourth transistor 331 is set to a voltage based on the threshold voltage of the fourth transistor 331 and the pulse width setting voltage, and subsequently, when the sweep signal, which linearly changes, is input via the first end of the third capacitor 335, the gate terminal voltage of the fourth transistor 331 is linearly changed in response to the sweep signal.

When the gate terminal voltage of the fourth transistor 331, which linearly changes, reaches the threshold voltage of the fourth transistor 331, the fourth transistor 331 is turned on, and the driving voltage VDD applied to a source terminal of the fourth transistor 331 is applied to the gate terminal of the first transistor 325 via the drain terminal of the fourth transistor 331 (in this case, the eighth transistor 350 should be in a turned-on state). Accordingly, the first transistor 325 is turned off, and the driving current flowing through the luminous element 200 is stopped, so that a light-emission time of the luminous element 200 is controlled.

At this time, the slope at which the sweep signal changes linearly is the same for all pixel circuits constituting a display panel, and the gate terminal voltage of the fourth transistor 331 is linearly converted from the voltage based on the threshold voltage of the fourth transistor 331 and the pulse width setting voltage according to the input of the sweep signal.

Thus, the time at which the gate terminal voltage of the fourth transistor 331 reaches the threshold voltage of the fourth transistor 331 after the sweep signal is applied is changed depending on the magnitude of the pulse width setting voltage, the PWM driving circuit 330 may represent various gradations depending on the magnitude of the pulse width setting voltage.

In addition, a driving time of the driving current flowing through the first transistor 325 is a time until the gate terminal voltage of the fourth transistor 331 linearly changes from the voltage, which is based on the threshold voltage of the fourth transistor 331 and the pulse width setting voltage, according to the input of the sweep signal and reaches the threshold voltage of the fourth transistor 331, and thus is determined independently of the threshold voltage of the fourth transistor 331.

Thus, according to an embodiment of the present disclosure, a threshold voltage deviation between the fourth transistors 331 respectively included in a plurality of pixel circuits may be compensated.

The detailed configurations of the circuits shown in FIG. 7, in particular, the PAM driving circuit 310 and the PWM driving circuit 330, may be different.

In FIG. 7, all the transistors included in the pixel circuit are illustrated as being implemented as P-channel metal oxide semiconductor field effect transistors (PMOSFETs), but the present disclosure is not limited thereto. Accordingly, the transistors included in the pixel circuit may be implemented as N-channel metal oxide semiconductor field effect transistors (NMOSFETs).

Figure 8:
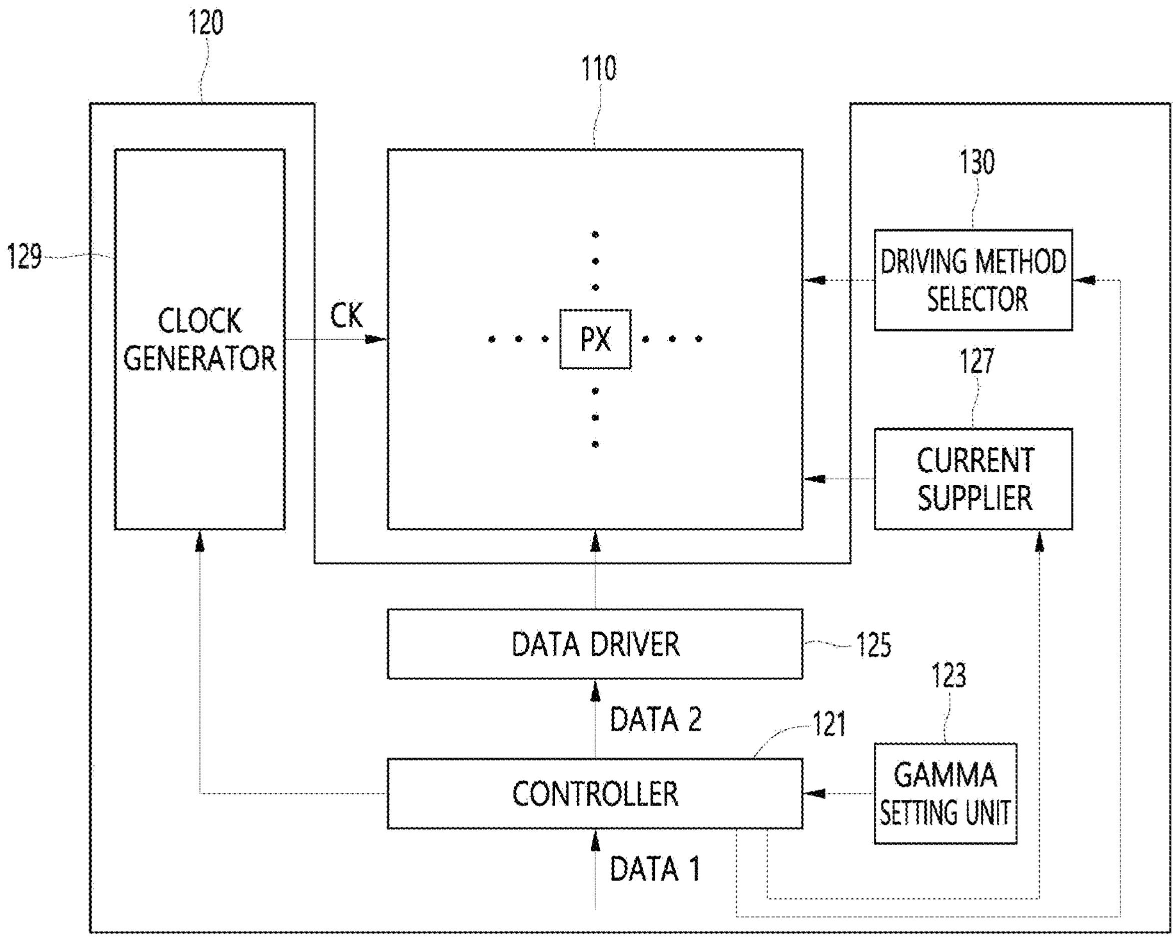
FIG. 8 is a diagram schematically illustrating a display device according to an embodiment of the present disclosure.

FIG. 8 is a diagram schematically illustrating a display device according to an embodiment of the present disclosure.

FIG. 8 may be a diagram illustrating the display device illustrated in FIG. 2 in more detail. Thus, the contents mentioned in FIG. 2 will be omitted.

In an embodiment, a driver 120 may include a controller 121, a gamma setting unit 123, a data driver 125, a current supplier 127, a clock generator 129, and a driving method selector 130.

In an embodiment, the controller 121 may receive image data of one frame from an external source (for example, a graphic controller), and extract gradations for each pixel PX from the image data, and convert the extracted gradations into digital data with a preset number of bits.

In an embodiment, the controller 121 receives a correction value from the gamma setting unit 123 and performs gamma correction of input image data DATA1 using the correction value, thereby generating corrected image data DATA2. The controller 121 may output the corrected image data DATA2 to the data driver 125. The controller 121 outputs the corrected image data DATA2 to the data driver 125 in a predetermined order, starting with a most significant bit (MSB) and ending with a least significant bit (LSB).

In an embodiment, the gamma setting unit 123 may set a gamma value using a gamma curve, set a correction value of image data according to the set gamma value, and output the set correction value to the controller 121. The gamma setting unit 123 may be provided as a circuit separate from the controller 121, or may be provided to be included in the controller 121.

In an embodiment, the driver 120 may further include a bit converter. The bit converter may correspond to the bit converter 500 described above with reference to FIG. 5.

In an embodiment, the bit converter may generate image data (e.g., the region representation bits 502 and the gradation representation bits 503 of FIG. 5) converted based on the input image data DATA1 or the corrected image data DATA2. That is, the data conversion performed by the bit converter may be based on the input image data DATA1 or the corrected image data DATA2.

In an embodiment, the corrected image data DATA2 output to each component by the controller 121 may be the image data converted by the bit converter. That is, the image data conversion of the bit converter may be performed together with a process of generating the corrected image data DATA2 by the controller 121.

The bit converter may be provided as a circuit separate from the controller 121 or may be provided to be included in the controller 121.

In an embodiment, the data driver 125 may transfer, to each pixel PX of the pixel unit 110, the corrected image data DATA2 output from the controller 121. The data driver 125 may provide a bit value included in the corrected image data DATA2 to each pixel PX for each frame. The bit value may have one of a first logic level and a second logic level. The first logic level and the second logic level may be a high level and a low level, respectively. Alternatively, the first logic level and the second logic level may be a low level and a high level, respectively.

In an embodiment, one frame may include a plurality of subframes. Each of the subframes may have a different length. For example, the length of the subframe corresponding to the MSB of the corrected image data DATA2 may be set to be the longest, and the length of the subframe corresponding to the LSB may be set to be the shortest. The order of the MSB to the LSB in the corrected image data DATA2 may correspond to the order of a first subframe to an n-th subframe. The order of expression of subframes may be set differently depending on the designer.

In an embodiment, the data driver 125 may include a line buffer and a shift register circuit. The line buffer may be a one-line buffer or a two-line buffer. The data driver 125 may provide image data of specific bits to each pixel on a line-by-line basis (a row-by-row basis).

In an embodiment, the current supplier 127 may generate and supply a driving current of each pixel PX.

In an embodiment, the clock generator 129 may generate a clock signal for every subframe during one frame and output the generated clock signal to the pixels PX. The length of the clock signal may be the same as the length of the corresponding subframe. The clock generator 129 may sequentially supply the clock signal to a clock line CL for every subframe. The clock generator 129 may generate the clock signal according to a predetermined subframe order. For example, when the order of expression of four subframes is 1-2-3-4, the clock generator 129 may sequentially output a first clock signal to a fourth clock signal in the order of the first subframe to a fourth subframe. When the output order of the four subframes is 1-3-2-4, the clock generator 129 may output the clock signal in the order of the first clock signal, a third clock signal, a second clock signal, and the fourth clock signal as in the order of the first subframe, a third subframe, a second subframe, and the fourth subframe. Meanwhile, the clock signal may include a control signal Sense, a control signal SPWM, and a control signal SPAM.

In an embodiment, the driving method selector 130 may generate and output a driving method selection signal to the pixels PX. In an embodiment, the driving method selector 130 may generate a driving method selection signal for selecting a PAM driving method when a gradation extracted based on image data is included in a high-gradation region, and generate a driving method selection signal for selecting a PWM driving method when the gradation extracted based on the image data is included in a low-gradation region.

The image data, which is the basis for generating the driving method selection signal by the driving method selector 130, may be based on data before being converted by the bit converter or may be based on data after being converted by the bit converter. In other words, the driving method selector 130 may generate the driving method selection signal on the basis of the region representation bits 502 and the gradation representation bits 503 of FIG. 5, which are pieces of data converted by the bit converter, or generate the driving method selection signal on the basis of the image data 501 of FIG. 5, which is data before being converted by the bit converter.

In the embodiment in which the driving method selection signal is generated based on the data before being converted by the bit converter, the driving method selection signal may be generated based on the MSB of the image data 501 of FIG. 5. In other words, the driving method selector 130 may determine whether the gradation corresponding to the image data 501 is included in the high-gradation region or the low-gradation region on the basis of the MSB of the image data 501. That is, when the value of the MSB of the image data is "1," the gradation extracted based on the image data may be included in the high-gradation region, and when the value of the MSB of the image data is "0," the gradation extracted based on the image data may be included in the low-gradation region. As a result, when the value of the MSB of the image data 501 of FIG. 5 is "0," the driving method selection signal is generated to select the PWM driving method, and when the value of the MSB of the image data 501 of FIG. 5 is "1," the driving method selection signal may be generated to select the PAM driving method.

In this embodiment, the driver 120 may determine whether a single bit value of the MSB of the image data is "0" or "1", select the PAM driving circuit or the PWM driving circuit based on the single bit value of MSB the image data. Then, the driver 120 may generate a driving method selection signal to select one of the PAM driving circuit or the PWM driving circuit based on a selection result, and control light emission of the luminous element by an operation of the PWM driving circuit or an operation of the PAM driving circuit based on the driving method selection signal, wherein, when a value of the MSB of the image data is "1" the PAM driving circuit is selected to express the gradation value of the image data with the MSB being "1", and when the value of the MSB is "0" the PWM driving circuit is selected to express the gradation value of the image data with the MSB being "0".

In the embodiment in which the driving method selection signal is generated based on the data converted by the bit converter, the driving method selection signal may be generated based on the region representation bits 502 of FIG. 5. In other words, the driving method selector 130 may determine whether the gradation of the gradation representation bits 503 is included in the high-gradation region or the low-gradation region on the basis of the region representation bits 502. Specifically, when the region representation bits 502 of FIG. 5 have one of "00," "01," and "10," the driving method selection signal is generated to select the PWM driving method, and when the region representation bits 502 of FIG. 5 have "11," the driving method selection signal may be generated to select the PAM driving method.

The driving method selector 130 may be provided as a circuit separate from the controller 121, or may be provided to be included in the controller 121.

Each component of the driver 120 may be formed in the form of a separate integrated circuit chip or a single integrated circuit chip, and be mounted directly on a substrate on which the pixel unit 110 is formed, or be mounted on a flexible printed circuit film, or be attached in the form of a TCP (tape carrier package) on a substrate, or be formed directly on the substrate. In an embodiment, some of the controller 121, the gamma setting unit 123, the data driver 125, the current supplier 127, the clock generator 129, and the driving method selector 130 are connected to the pixel unit 110 in the form of an integrated circuit chip, and another some thereof may be directly formed on the substrate.

Figure 9:
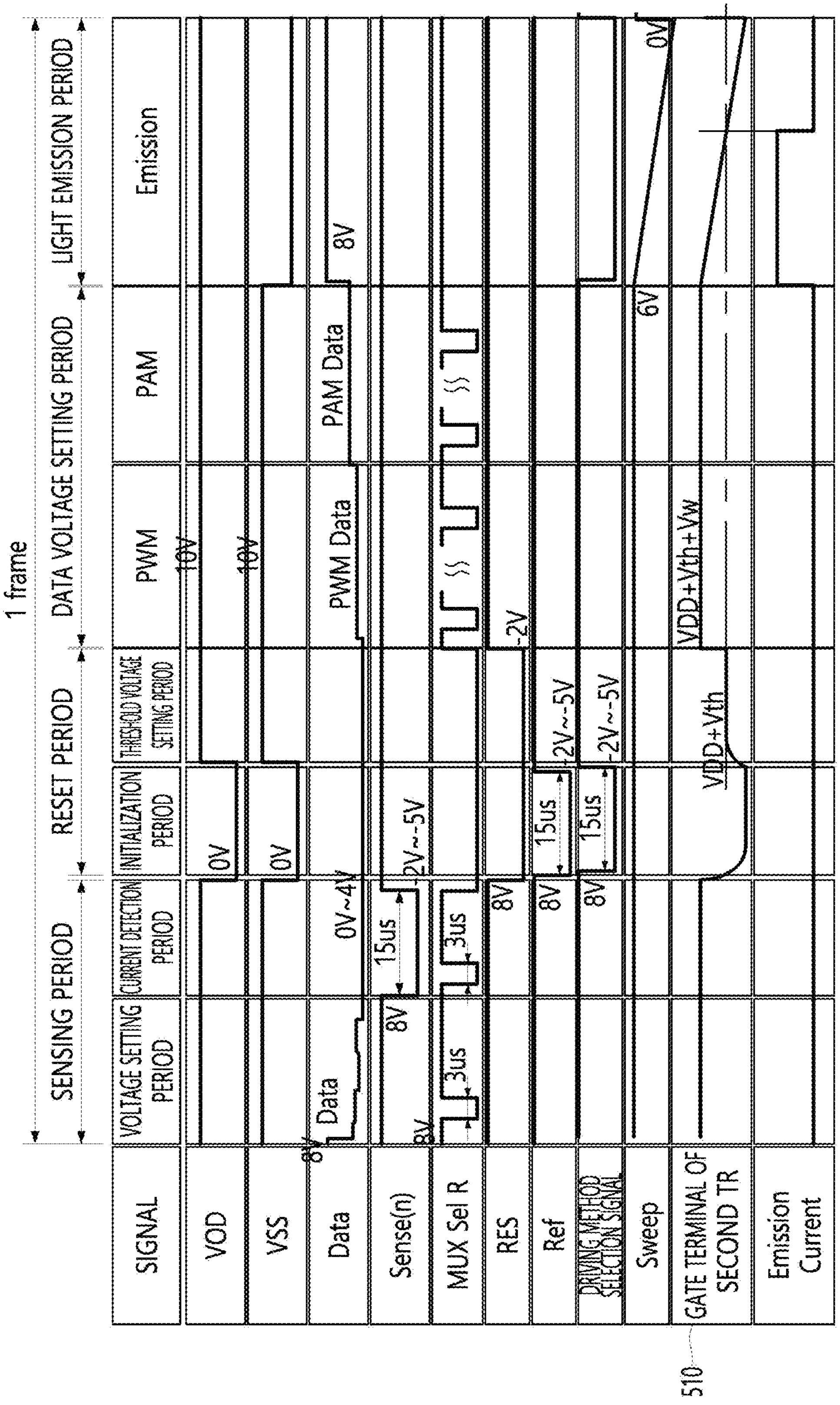
FIG. 9 is a timing diagram of various signals for driving the pixel circuit according to an embodiment of the present disclosure.

FIG. 9 is a timing diagram of various signals for driving the pixel circuit according to an embodiment of the present disclosure.

The values of voltages, times, and the like illustrated in FIG. 9 are exemplary and are not intended to be limiting.

Referring to FIG. 9, the pixel circuit may be driven in the order of a sensing period (duration), a reset period, a data voltage setting period, and a light emission period, while displaying one image frame.

The sensing period is a period for detecting a current flowing through the first transistor. The sensing period may include a voltage setting period and a current detection period, wherein the voltage setting period is a period for applying a specific voltage to the gate terminal of the first transistor, and the current detection period is a period for detecting a current corresponding to the specific voltage flowing through the first transistor. In this case, the specific voltage is a voltage different from the amplitude setting voltage that determines the amplitude of the driving current provided to the luminous element. The specific voltage is a voltage for compensating for a threshold voltage deviation between the first transistors respectively included in the plurality of driving circuits by detecting currents, which correspond to the specific voltage, flowing through the first transistors.

Specifically, when the third transistor is turned on in response to the control signal SPAM(n) within the voltage setting period, the specific voltage is charged to the first capacitor via the data line. Thereafter, when the second transistor is turned on in response to the control signal Sense within the current detection period, a current corresponding to the specific voltage flowing through the first transistor is transmitted to the data line through the second transistor.

Meanwhile, the specific voltage may be variously set according to an embodiment. For example, the specific voltage for detecting a driving current (i.e., typical current) when the display panel is normally driven and the specific voltage for detecting a driving current (i.e., peak current) when the display panel is driven at maximum brightness may be different, and the specific voltage of a different magnitude may be applied via the data line during the voltage setting period as necessary.

The current transmitted to the data line as described above may be detected by a current detector (not shown) outside the driving circuit. Thus, according to an embodiment of the present disclosure, a configuration (e.g., a processor or a timing controller (TCON)) provided outside the driving circuit may correct the amplitude setting voltage on the basis of the detected current, and apply the corrected amplitude setting voltage to the PAM driving circuit during the data voltage setting period, thereby compensating for the threshold voltage deviation between the first transistors respectively included in the plurality of driving circuits constituting the display device.

For example, when the specific voltage applied to the gate terminal of the first transistor during the voltage setting period is "a" and the magnitude of the detected current is "x," the processor or TCON may determine a magnitude (e.g., y) of the current corresponding to the voltage "a" from a pre-stored table in which magnitude values of the specific voltage and the current are mapped. Accordingly, when "x" is greater than "y," that is, when the detected current is greater than the current according to the table, the processor or TCON may then correct the amplitude setting voltage to be applied to the first transistor to be lower in the data voltage setting period. When "x" is less than "y," the amplitude setting voltage may be corrected to have a higher value and applied to the PAM driving circuit. Accordingly, the threshold voltage deviation between the first transistors respectively included in the plurality of driving circuits constituting the plurality of pixels of the display panel may be compensated.

The reset period is a period for setting the gate terminal voltage of the fourth transistor to the voltage based on the threshold voltage of the fourth transistor. In this case, the reset period may include an initialization period and a threshold voltage setting period, wherein the initialization period is a period for setting the gate terminal voltage of the fourth transistor of the pixel circuit and/or the gate terminal voltage of the first transistor to a preset reference voltage, and the threshold voltage setting period is a period for setting the gate terminal voltage of the fourth transistor to the voltage based on the threshold voltage of the fourth transistor.

Specifically, when the reset period starts, the fifth transistor is turned on in response to a control signal RES. At this time, while the fifth transistor is turned on, the sixth transistor is turned on/off in response to a control signal Ref. Specifically, the sixth transistor may be turned on during the initialization period and then turned off, as shown in FIG. 9.

When the sixth transistor is turned on, the preset reference voltage (0 V to 4 V in the example of FIG. 9) is applied to the gate terminal of the fourth transistor via the data line, so that the gate terminal voltage of the fourth transistor is set to the reference voltage while the sixth transistor is on, as shown in reference numeral 510 of FIG. 9.

Thereafter, when the threshold voltage setting period starts, the sixth transistor is turned off, so that the gate terminal voltage of the fourth transistor is set to a voltage corresponding to the sum of the driving voltage VDD and a threshold voltage Vth of the fourth transistor.

Meanwhile, referring to FIG. 9, since the eighth transistor is turned on in response to the driving method selection signal while the sixth transistor is turned on, the reference voltage applied to the gate terminal of the fourth transistor is equally applied to the gate terminal of the first transistor. That is, during the initialization period, both the gate terminal voltage of the fourth transistor and the gate terminal voltage of the first transistor may be set to the preset reference voltage (e.g., 0 V).

As described above, by clearly setting the gate terminal voltage of the fourth transistor and the gate terminal voltage of the first transistor to the reference voltage before the threshold voltage setting period, inaccurate operation due to floating of the gate terminal voltage of the fourth transistor may be prevented.

The data voltage setting period is a period for applying the pulse width setting voltage PWM Data and the amplitude setting voltage PAM Data to each of the PWM driving circuit and the PAM driving circuit.

Specifically, during the data voltage setting period, when the seventh transistor is turned on in response to the control signal SPWM (n), the pulse width setting voltage applied via the data line is applied to the gate terminal of the fourth transistor through the second capacitor. Accordingly, the gate terminal voltage of the fourth transistor is raised by only a pulse width setting voltage Vw, as shown in reference numeral 510 of FIG. 9, and the raised voltage is maintained due to the second capacitor.

Meanwhile, during the data voltage setting period, when the third transistor is turned on in response to the control signal SPAM(n), the amplitude setting voltage applied via the data line is charged and maintained in the first capacitor. At this time, the amplitude setting voltage applied via the data line may be a voltage corrected based on the current, which flows through the first transistor and is detected during the sensing period.

Meanwhile, in the example of FIG. 9, a case in which "PWM Data," i.e., the pulse width setting voltage is applied first and then "PAM Data," i.e., the amplitude setting voltage is applied is illustrated as an example, but the present disclosure is not limited thereto, and according to an embodiment, "PWM Data" may be applied after "PAM Data" is applied.

The light emission period is a period in which the luminous element emits light according to the pulse width setting voltage and the amplitude setting voltage. Specifically, as shown in FIG. 9, when the light emission period starts, the voltage of the ground voltage terminal of the pixel circuit drops to the ground voltage VSS (e.g., 0 V), and accordingly, the first transistor is turned on and a driving current having an amplitude corresponding to the amplitude setting voltage charged to the first capacitor is provided to the luminous element. Accordingly, the luminous element 200 starts to emit light.

When the light emission period starts, a sweep voltage is applied to one end of the second capacitor through the third capacitor, and thus the gate terminal voltage of the fourth transistor connected to the other end of the second capacitor is also linearly reduced from the maintained voltage (VDD+Vth+Vw) according to the sweep voltage.

When the linearly decreasing gate terminal voltage of the fourth transistor reaches the threshold voltage Vth of the fourth transistor, the fourth transistor is turned on, and the driving voltage VDD is applied to the gate terminal of the first transistor through the eighth transistor. Accordingly, when the first transistor is turned off, the driving current is cut off, and the luminous element stops emitting light.

In other words, the luminous element emits light from the start of the light emission period until the gate terminal voltage of the fourth transistor decreases linearly according to the sweep voltage and reaches the threshold voltage Vth of the fourth transistor.

Figure 10:
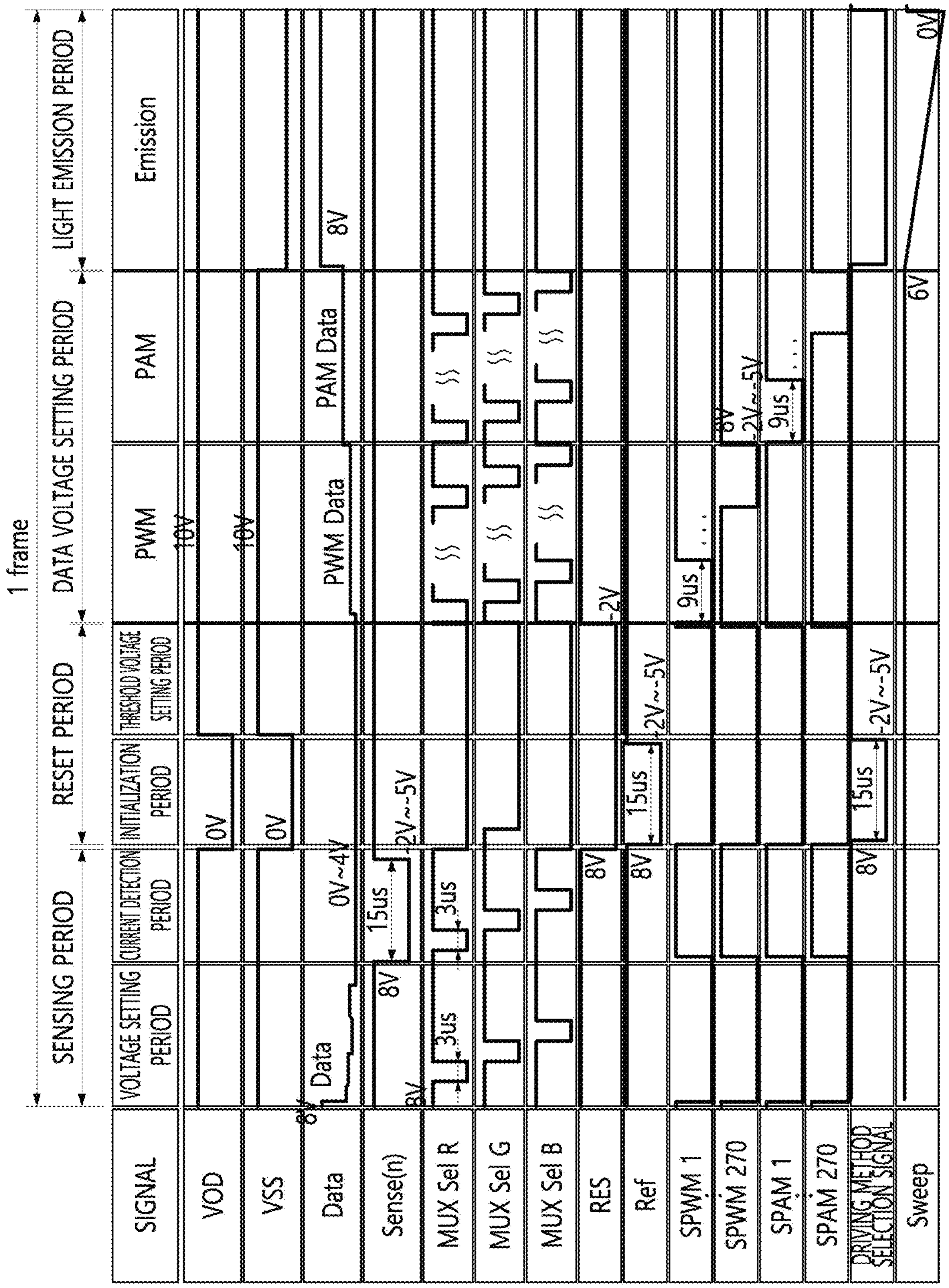
FIG. 10 is a timing diagram of various signals for driving all of a plurality of driving circuits included in the display device according to an embodiment of the present disclosure.

FIG. 10 is a timing diagram of various signals for driving all of the plurality of driving circuits included in the display device according to an embodiment of the present disclosure.

In describing FIG. 10, descriptions of the same contents as those described above will be omitted.

The values of voltages, times, and the like illustrated in FIG. 10 are exemplary and are not intended to be limiting.

FIG. 10 illustrates an embodiment with 270 horizontal lines constituting the plurality of pixels included in the display device.

Thus, referring to FIG. 10, it may be seen that the control signals SPWM and SPAM are sequentially driven from "SPWM 1" to "SPWM 270", and from "SPAM 1" to "SPAM 270," respectively, in the data voltage setting period.

Meanwhile, according to an embodiment of the present disclosure, red (R), green (G), and blue (B) sub-pixels constituting each pixel may have a structure connected to one data line. In this case, the R, G, and B sub-pixels may receive different data voltages applied via one data line through a multiplexer Mux.

Thus, as shown in FIG. 10, the R, G, and B sub-pixels constituting each pixel may be time-divisionally driven (or sequentially selected) through the multiplexer during the data voltage setting period to receive the pulse width setting voltage or the amplitude setting voltages of different magnitudes via the data line.

The same operation may also be applied in the sensing period, and as shown in FIG. 10, the R, G, and B sub-pixels constituting each pixel may be sequentially selected through the multiplexer during the voltage setting period to receive a specific voltage of different magnitudes from the data line.

In this case, the specific voltage input to each of the R, G, and B sub-pixels may be a theoretically or experimentally determined value based on the type of the sub-pixel. According to an embodiment, the specific voltage of different magnitudes may be input to each of the R, G, and B sub-pixels, or the specific voltage of the same magnitude may be input to each of the R, G, and B sub-pixels.

In addition, the display device may be driven to detect a current, which flows through the first transistor of the pixel circuit corresponding to the R, G, and B sub-pixels during the sensing period, at different time periods in the current detection period.

Here, the display device may be driven to detect currents flowing through first transistors of a plurality of pixel circuits during the sensing period, wherein the plurality of pixel circuits are for driving a plurality of luminous elements constituting a plurality of pixels included in one horizontal line among the plurality of pixels constituting a matrix form. That is, the display device may be driven to detect only the currents flowing through the first transistors of the plurality of pixel circuits constituting the plurality of pixels arranged on one horizontal line, for one image frame. That is, the display device may be driven to detect the currents flowing through the first transistors only for one horizontal line per image frame.

In general, since a time during which one image frame is displayed is a very short time that a viewer cannot recognize by eyes, sensing only one horizontal line per image frame as described above may be sufficient to compensate for the threshold voltage deviation between the first transistors.

However, the present disclosure is not limited to this example, and the display device may be driven to detect currents flowing through the first transistors included in two or more horizontal lines during the sensing period, for one image frame.

At least some of the configurations according to the various embodiments described above may include a processor, an application-specific integrated circuit (ASIC), other chipsets, a logic circuit, registers, communication modems, and data processing devices, and the like, which are known in the art to execute the various control logics described above. In addition, when the above-described control logic is implemented in software, the control logic may be implemented as a set of program modules. In this case, the program modules may be stored in the memory and executed by the processor.

The computer program may include a code coded in a computer language such as C/C++, C#, JAVA, Python, machine language, or the like, which can be read by a processor (CPU) of a computer through a device interface of the computer, in order for the computer to read the program and execute the methods implemented as a program. Such code may include functional codes related to a function defining functions necessary for executing the methods and the like, and may include a control code related to an execution procedure necessary for the processor of the computer to execute the functions according to a predetermined procedure. In addition, the code may further include additional information necessary for the processor of the computer to execute the functions, or a code related to memory reference regarding a location (address address) in the internal or external memory of the computer at which the media needs to be referred to. In addition, when the processor of the computer needs to communicate with any other computer or server located remotely in order to execute the functions, the code may further include a communication-related code regarding how to communicate with any other computer or server remotely by using the communication module of the computer and regarding what information or media to transmit and receive during communication.

The storage medium is not a medium that stores data for a short moment, such as a register, a cache, a memory, and the like, but a medium that stores data semi-permanently and can be read by a device. Specifically, examples of the storage medium include a read-only memory (ROM), a random access memory (RAM), a CD-ROM, a magnetic tape, a floppy disk, an optical data storage device, and the like, but the present disclosure is not limited thereto. That is, the program may be stored in various recording media on various servers accessible by the computer or in various recording media on the computer of the user. In addition, the medium may store a code that is distributed in a computer system connected by a network and can be read by a computer in a distributed manner.

It will be understood by those skilled in the art to which the present embodiment pertains that the present disclosure may be implemented in modified forms without departing from the spirit and scope of the present disclosure. Accordingly, it will be understood that the idea of the present disclosure is not to be limited to the embodiments described above, the scope of the present disclosure should be defined by the claims to be described below, and equivalents to the claims should be interpreted to fall within the present disclosure.

According to various embodiments of the present disclosure, by combining a PAM driving method and a PWM driving method, advantages of each driving method can be utilized, thereby effectively driving a display.

In addition, by effectively using limited resources, it is possible to represent gradations at the same level as in the case of higher bits in a certain gradation region, thereby minimizing the increase in hardware due to bit expansion.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:

a plurality of pixels, wherein each of the plurality of pixels includes a luminous element to express a gradation value of image data and a pixel circuit connected to the luminous element, the pixel circuit comprising a pulse width modulation (PWM) driving circuit and a pulse amplitude modulation (PAM) driving circuit, wherein the image data comprising a most significant bit (MSB), at least one middle bit, and a least significant bit (LSB); and a processor configured to:

determine whether a single bit value of the MSB of the image data is "0" or "1";

select the PAM driving circuit or the PWM driving circuit based on the single bit value of the MSB of the image data;

generate a driving method selection signal to select one of the PAM driving circuit or the PWM driving circuit based on a selection result; and control light emission of the luminous element by an operation of the PWM driving circuit or an operation of the PAM driving circuit based on the driving method selection signal, wherein, when a value of the MSB of the image data is "1", the PAM driving circuit is selected to express the gradation value of the image data with the MSB being "1", and when the value of the MSB is "0", the PWM driving circuit is selected to express the gradation value of the image data with the MSB being "0".

2. The display device of claim 1, wherein the pixel circuit further includes a switch for electrically connect or disconnect the PAM driving circuit and the PWM driving circuit in response to the driving method selection signal.

3. The display device of claim 1, wherein each of the plurality of pixels includes a respective processor configured to generate the driving method selection signal based on the single bit value of the MSB of the image data.

4. A display device, comprising:

a pixel circuit connected to a luminous element to express a gradation value of image data comprising a most significant bit (MSB), at least one middle bit, and a least significant bit (LSB), the pixel circuit comprising a pulse width modulation (PWM) driving circuit and a pulse amplitude modulation (PAM) driving circuit; and a processor configured to:

determine whether a single bit value of the MSB of the image data is "0" or "1";

select the PAM driving circuit or the PWM driving circuit based on the single bit value of the MSB of the image data;

generate a driving method selection signal to select one of the PAM driving circuit or the PWM driving circuit based on a selection result; and control light emission of the luminous element by an operation of the PWM driving circuit or an operation of the PAM driving circuit based on the driving method selection signal, wherein, when a value of the MSB of the image data is "1", the PAM driving circuit is selected to express the gradation value of the image data with the MSB being "1", and when the value of the MSB is "0", the PWM driving circuit is selected to express the gradation value of the image data with the MSB being "0".

5. The display device of claim 4, wherein the pixel circuit further includes a switch for electrically connect or disconnect the PAM driving circuit and the PWM driving circuit in response to the driving method selection signal.

6. A display device comprising:

a plurality of pixels, wherein each of the plurality of pixels includes a pulse width modulation (PWM) driving circuit and a pulse amplitude modulation (PAM) driving circuit and drives light emission of a luminous element by an operation of the PWM driving circuit or the PAM driving circuit based on a driving method selection signal;

a lookup table containing correspondence between gradation representation bit values and region representation bit values;

a bit converter configured to convert image data into a combination of region representation bits and gradation representation bits by referring to the lookup table; and a processor configured to generate the driving method selection signal to select one of the PAM driving circuit to express the gradation representation bits when the region representation bits indicate a high-gradation region or the PWM driving circuit to express the gradation representation bits when the region representation bits indicate a low-gradation region.

7. The display device of claim 6, wherein the processor is further configured to convert image data with a size of n bits into region representation bits with a size of 2 bits and gradation representation bits with a size of n/2 bits.

8. The display device of claim 7, wherein the region representation bits are determined to represent which region of a first region, a second region, a third region, and a fourth region of the image data belongs to, and the first region, the second region, the third region, and the fourth region are formed by dividing an entire gradation region including $2^n$ gradations represented by n bits.

9. The display device of claim 8, wherein when the region representation bits are "00," the image data belongs to the first region, when the region representation bits are "01," the image data belongs to the second region, when the region representation bits are "10," the image data belongs to the third region, and when the region representation bits are "11," the image data belongs to the fourth region.

10. The display device of claim 9, wherein the driving method selection signal is generated such that a pixel circuit of each pixel drives light emission of the luminous element by an operation of the PWM driving circuit when the region representation bits are one of "00," "01," or "10," and the driving method selection signal is generated such that the pixel circuit of each pixel drives the light emission of the luminous element by an operation of the PAM driving circuit when the region representation bits are "11".

11. The display device of claim 8, wherein the first region, the second region, the third region, and the fourth region are formed by dividing the entire gradation region from low gradation to high gradation into ratios of ⅛, ⅛, ¼, and ½, which are respectively assigned thereto.

* * * * *